TELEPHONE SIGNALLING CIRCUITS

Filed Jan. 17, 1963

INVENTOR.

EDWARD H. LANHAM

By: Robert B. Harmon

ATTORNEY

April 19, 1966 E. H. LANHAM 3,247,327
TELEPHONE SIGNALLING CIRCUITS
Filed Jan. 17, 1963 2 Sheets-Sheet 2
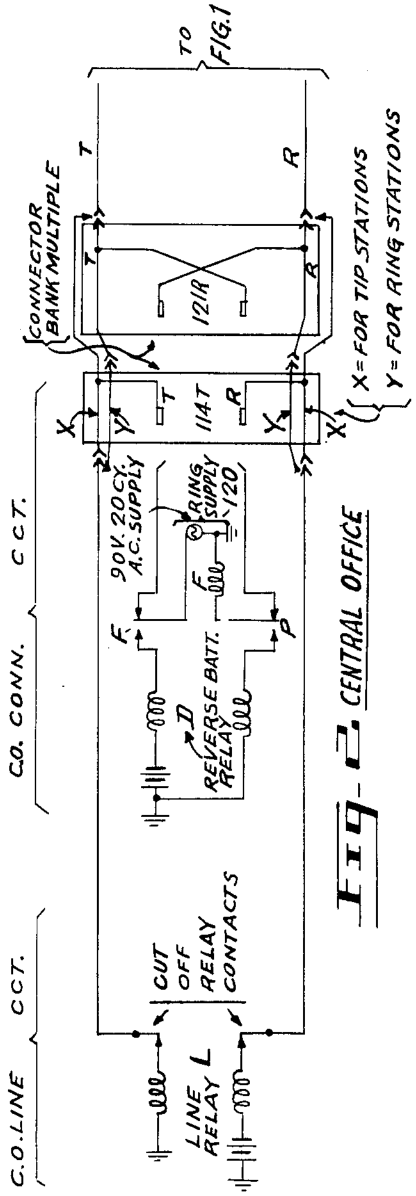
FIG. 2 CENTRAL OFFICE
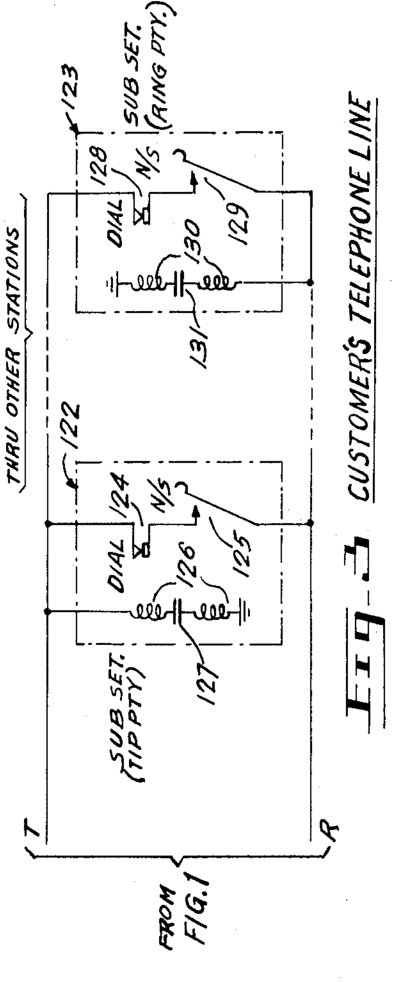
FIG. 3 CUSTOMER'S TELEPHONE LINE
INVENTOR.
EDWARD H. LANHAM
Robert B. Harmon
ATTORNEY 3,247,327
TELEPHONE SIGNALLING CIRCUITS Edward Herbert Lanham, Ottawa, Ontario, Canada, assignor to Northern Electric Company Limited, Montreal, Quebec, Canada, a corporation of Canada
Filed Jan. 17, 1963, Ser. No. 252,164
8 Claims. (Cl. 179—84)

This invention relates to telephone signalling circuits and particularly to circuits for two-way repeating and controlling voice and supervisory signals of either an alternating or direct current nature.

In the past, dial long line repeaters and inter-office trunks of the aforementioned type have required the use of electromagnetic relays to enable these circuits to receive alternating current ringing signals and to cause these received signals to effect the application of similar alternating current ringing signals, derived from a local generator, to the telephone line to the subscriber's station or distant central office. The use of electromagnetic relays in telephone long line and interoffice trunk circuits of the aforementioned types is objectionable in that such relays are by comparison large and heavy, require excessive operating power and continuous maintenance to keep them in efficient operating condition.

It is an object of this invention to provide a two-way repeater circuit having the foregoing properties with means to eliminate the need for using electromagnetic relays.

A further object of this invention is to provide a dial telephone long line repeater and dial telephone interoffice trunk whereby the dial impulses are received from a subscriber's station at a central office, to establish a switching connection and to originate ringing signals, and thereafter to repeat and amplify these signals under control of the central office.

It is a further object of this invention to provide means for eliminating the need for using electromagnetic relays for repeating alternating current ringing signals to subscriber lines and central office trunks of the well-known bridged ringing type wherein the station ringer or ringing signal receiving relay at the distant central office is bridged or connected across the incoming telephone line.

Another object of this invention is to eliminate the need for using electromagnetic relays for repeating alternating current ringing signals to subscribers' telephone lines of the divided ringing party line type wherein a group of subscriber's stations are connected across the telephone line for talking purposes, but wherein for the purpose of signalling, such group is divided into two groups; one of which has the station ringers connected from the tip side of the line to ground, while the other has the station ringers connected from the ring side of the line to ground.

These and other objects are obtained, in one embodiment of the invention by providing a two-way repeater circuit responsive to alternating current ringing signals received from a central office for transmission to a subscriber's station, arranged for divided or bridge type of operation. The two-way repeater includes a plurality of transistor circuits controlled by biasing potentials derived from the ringing signals transmitted from the calling C.O. and which are capable of switching the talking battery off and applying ringing potential to conform to divided or bridged ringing as required.

A better understanding may be had by referring to the following description, taken in conjunction with the drawings, in which:

FIG. 2 illustrates a circuit schematic of a typical central office showing only those elements required for the description of the invention; and FIG. 3 illustrates a circuit schematic of a typical arrangement of a plurality of subscriber's stations, two being shown, arranged for divided ringing transmission illustrating only the apparatus required for the description of the invention.

Figure 1:
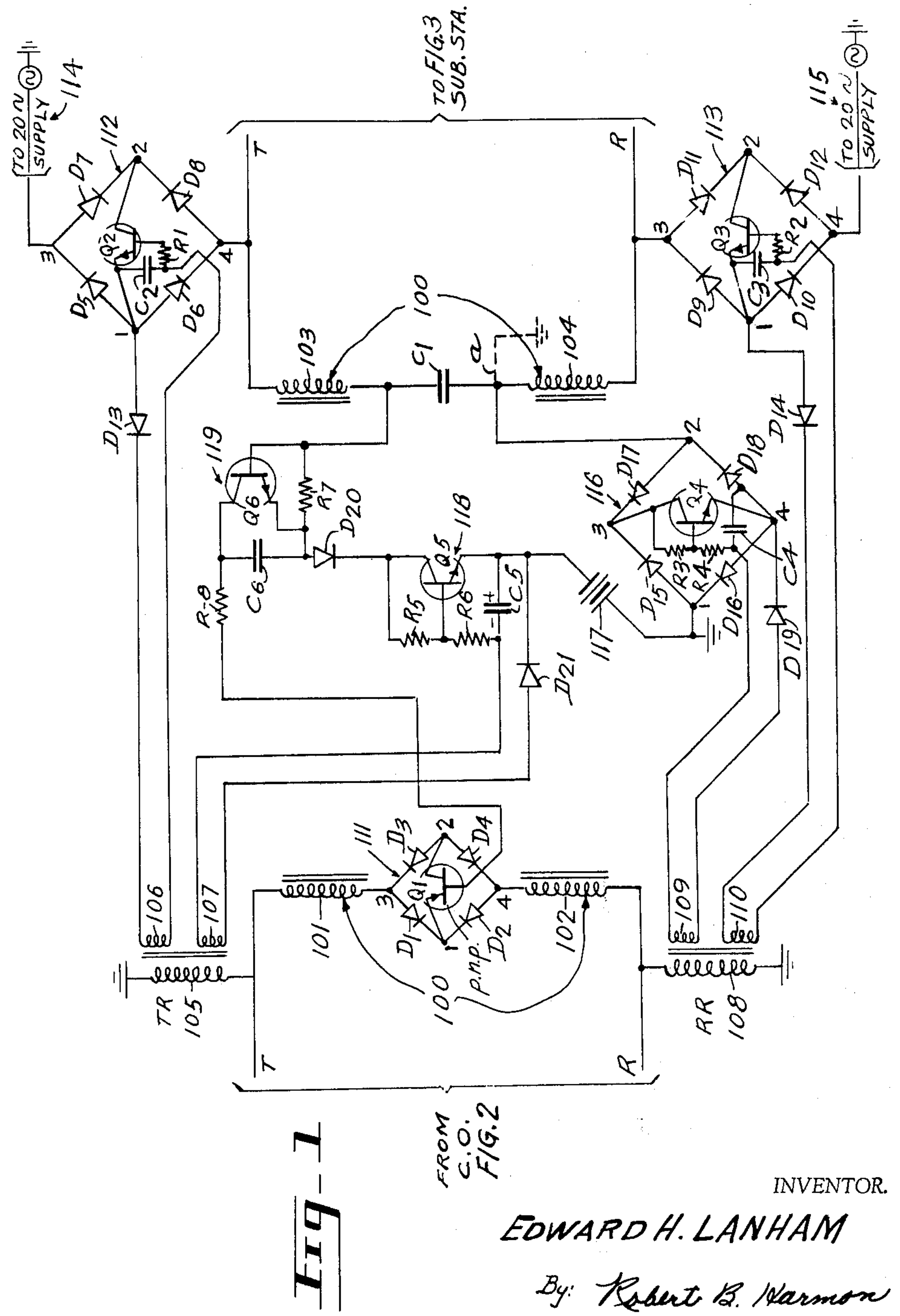
FIG. 1 illustrates a circuit schematic of the two-way repeater circuit of the invention.

Considering the drawings, there is shown in FIG. 1 repeating coil 100 having windings 101, 102 and 103, 104.

Also show are transformers TR and RR. Transformer TR with coupling capacitor C1 connected to inner ends of the windings 103, 104 consists of primary winding 105, the inner end connected to the tip side of the central office loop and the outer end to ground, and secondary windings 106, 107 connected as described hereinafter. Transformer RR consists of primary winding 108, the inner end connected to the ring side of the central office loop and the outer end to ground and the secondary windings 109, 110 connected as described hereinafter.

Also shown in FIG. 1 is a first four arm full wave rectifier bridge circuit 111 composed of a first, second and a third, fourth diode, D1, D2 and D3, D4 respectively, diodes D1, D2 and D3, D4 being joined together to form a first and second junction point respectively, the outer ends of diodes D1, D3 and D2, D4 being joined together to form a third and fourth junction point respectively.

Included in the bridge circuit 111 is the p-n-p transistor Q1 having the emitter and collector electrodes connected to the first and second junction point. The third and fourth junction points of the bridge circuit 111 are connected to the inner ends of the windings 101, 102.

Also shown in FIG. 1, is the second and third four arm full wave rectifier circuit 112, 113 respectively composed of a first, second and a third, fourth diode D5, D6 and D7, D8 with respect to bridge circuit 112 and D9, D10 and D11, D12 with respect to bridge circuit 113. Diodes D5, D6 and D7, D8 and D9, D10 and D11, D12 are joined together to form individually a first and second junction point respectively while the outer ends of diodes D5, D7 and D6, D8 and D9, D11 and D10, D12 are joined together to form individually a third and fourth junction point respectively.

Included individually in the bridge circuits 112, 113 are the n-p-n transistors Q2, Q3 having the emitter and collector electrodes, connected to the first and second junction points and resistor and capacitor R1, C2 and R2, C3, joined in serial relation, connected to the base and emitter electrodes respectively.

Winding 106 is connected, through diode D13, to the first junction point of bridge circuit 112 and to the junction point between the resistor R1 and capacitor C2. Winding 110 is connected through diode D14 to the first junction point of bridge circuit 112 and to the junction point between the resistor R2 and capacitor C3.

Connected to the third and fourth junction points of bridge circuits 112, 113 is the ringing sources 114, 115 individual to each bridge circuit.

Shown in FIG. 1, is a fourth full wave four arm rectifier circuit 116 composed of diodes D15, D16 and D17, D18 joined together to form a first and second junction point respectively, the outer ends of diodes D15, D16 and D17, D18 being joined together to form a third and fourth junction point respectively.

Included in bridge circuit 116 is n-p-n transistor Q4 having the emitter and collector electrodes connected to the third and fourth junction point respectively. Contained in this bridge circuit 116 is the resistor R3 connected to the base electrode and the third junction point and resistor R4, in serial relation, with capacitor C4, connected to the base and emitter electrodes. The second junction point of this bridge circuit 116 is connected to the junction point between the capacitor C1 and the inner end of its winding 104 of the repeater coil 100. The winding 109 is connected through diode D19 to the fourth junction point of the bridge circuit 116 and to the junction point between resistor R4 and capacitor C4.

Also shown in FIG. 1 is the grounded talking direct current energy source 117 with the ground connected to the first junction point of the bridge circuit 116.

Shown in FIG. 1, is a fifth transistor circuit 118 including a resistor R5 connected to base and collector electrodes and resistor R6, in serial relation with capacitor C5, connected to the base and emitter electrodes. The emitter electrode of the circuit is connected to the direct current energy source 117 and the collector through diode D20 and resistor R7 to the junction point between the inner end of winding 103 and the capacitor C1.

Winding 107 is connected through diode D21 to the emitter electrode and to the junction point of resistor R6 and capacitor C5 of circuit 118.

In addition there is included in the circuit shown in FIG. 1, a sixth transistor circuit 119 consisting of transistor Q6 having the emitter electrode connected to the diode D20 and the collector electrode to the base electrode of transistor Q1 through resistor R8. Shunted across the collector and emitter electrode of transistor Q6 is the bypass capacitor C6. Transistors Q1 and Q2, Q3, Q4, Q5, Q6 are complementary to each other and together form a supervisory circuit for tripping, ringing and repeating direct current supervisory signals and dial pulses.

Consider FIG. 2, which illustrates part of the equipment located in a central office, there is shown line relay L, ringing supply 120, such as 90 volts, 20 cycle alternating current, ringing trip relay F, reverse battery relay D, connector bank 121.

In FIG. 3 there is shown two of a plurality of subscriber's stations 122, 123 each including dial contacts, switchhook contacts, ringer coils and blocking capacitors 124, 125, 126, 127 and 128, 129, 130, 131, respectively.

The following are representative values, of the indicated elements, which may be employed in the invention:

Capacitors:

| | | |
|---|---|---|
| C1 | mf | 5 |
| C2 | mf | 200 |
| C3 | mf | 200 |
| C4 | mf | 200 |
| C5 | mf | 200 |
| C6 | mf | .05 |

Resistors:

| | |
|---|---|
| R1 | 90Ω |
| R2 | 3500Ω |
| R3 | 90Ω |
| R4 | 45Ω |
| R5 | 90Ω |
| R6 | 350Ω |
| R7 | 50Ω |

OPERATION

In the operation of the repeating circuit of the invention, the signalling circuit disclosed in the Canadian patent Serial No. 677,734 to P. J. Read, issued January 7, 1964, may be employed in this invention with respect to direct current supervisory signals and dial pulse signals transmitted from the subscriber's station, FIG. 3, of this invention.

The functions of the transistor circuits employed in the invention are as follows, their state in the quiescent condition of the circuit being as indicated:

Q1 cut-off—normally presents an on-hook or open circuit condition to the central office equipment, changes to an off-hook or closed circuit condition depending upon the open or closed (on- or off-hook) condition of Q6 (FIG. 1).

Q2 cut-off—operates to apply 20 cycle ringing potential to the tip side of the line through the station ringers, FIG. 3.

Q3 cut-off—operates to apply 20 cycle ringing potential to the ring side of the line through the station ringers, FIG. 3.

Q4 turned on—operates to remove the ground from the ring side of the line when ringing ring side station bells to prevent short circuiting the station bells, FIG. 3.

Q5 turned on—operates to open the talking circuit during the transmission of ringing signals.

Q6 cut-off—operates as a switch to control Q1 in response to an on-hook (open circuit) or off-hook (closed circuit) condition of the subscriber's station switchhook 125 or 129, FIG. 2.

In general, the application of alternating current ringing signals and transmissions battery to the called station, or stations, is controlled by electrical bias derived from the incoming ringing potential.

With no call in progress, the central office loop comprises a circuit extending from battery 120, FIG. 2, through the lower winding of relay L, line conductor R, repeating coil winding 102, diode D4, transistor Q1, diode D1, repeating coil winding 101, line conductor T, FIG. 1, upper winding of relay L to ground, FIG. 2. When no call is in progress, transistor Q1 is turned off and insufficient current will flow to operate relay L.

*Ringing on ring side*

Assume now that a call is to be extended from the central office, FIG. 2, to a subscriber, FIG. 3, whose station ringer is connected from the ring side of the telephone line to ground.

In this case the central office equipment will connect a signalling potential from source 120 to the ring conductor of the central office loop. The ringing potential will be impressed across primary winding 108 of transformer RR. Transformer RR has two secondary windings, 109 and 110. Winding 110 is connected in the base-emitter circuit of transistor Q3 as shown in FIG. 1. The ohmic resistance of winding 109 is of a sufficiently low value to maintain the transistor Q3 in cut off during periods of no signalling. When an incoming ringing signal from the distant office is impressed across winding 108, the resulting voltage induced in winding 110 will be rectified by diode D14 and will appear across the base/emitter junction of transistor Q3, driving the emitter negative with respect to the base and causing the transistor to change from the "off" condition to the "on" or conducting condition. Similarly, secondary winding 109 is connected to the base/emitter circuit of transistor Q4. The ohmic resistance of winding 109 in series with resistor R4 and diode D19 connected across the base/emitter junction of Q4 is of sufficient value in relation to resistor R3 which is connected across the base/collector junction to maintain transistor Q4 in the "on" condition during period of no signaling. The voltage induced in winding 110 (simultaneously with the voltage induced in winding 109) will be rectified by diode D19 and will appear across the base/emitted junction of Q4 but poled in a direction to drive the emitter of Q4 positive with respect to the base and to cause Q4 to change from the "on" condition to the "off" or non-conducting condition.

The capacitors C2 and C3 serve to smooth the rectified voltage appearing across the base/emitter junctions of Q2 and Q3 and to maintain a steady potential across these respective junctions during signalling periods.

Transistor Q4 turned "off" will open the ground connection to repeating coil winding 104. Transistor Q3 turned "on" will complete a circuit for the application of ringing potential from source 115 to the ring side of the subscriber's telephone line, thus causing the operation of all ringers connected therefrom to ground. Diodes D9, D10, D11, D12 form a full wave rectifier which maintains negative and positive potential on the emitter and collector, respectively, of Q3 regardless of the polarity of the alternating ringing potential.

When the central office ringing signal ceases, a potential difference will no longer appear across secondary windings 109 and 110 of transformer RR. Transistor Q3 will therefore revert to the "off" condition and transistor Q4 will revert to the "on" condition, cutting off ringing potential and restoring transmission ground to the telephone line, respectively. When the called subscriber's station goes off-hook a circuit will be closed, during the silent period, from battery source 117 through closed transistor Q5, diode D20, resistor R7, winding 103 of the repeating coil, over the telephone line and subscriber's telephone set, through repeating coil winding 104, rectifier bridge circuit 116 to ground. In consequence of the closure of this circuit, the potential appearing across R7 will cause transistor Q6 to switch "on," in turn causing transistor Q1 to switch "on" and close a direct current loop to the central office. This closure can be traced from the tip side of the central office trunk, through repeating coil winding 101, full wave rectifier bridge circuit 111 comprising diodes D1, D2, D3 and D4 and closed transistor Q1, repeating coil winding 102, to the ring side of the central office trunk. The closure of this D.C. loop will cause the central office equipment to trip ringing and to revert to the talking condition.

When the central office equipment applies ringing potential to the tip side of the trunk, instead of to the ring side, ringing potential will be impressed across the primary winding 105 of transformer TR. Transformer TR has two secondary windings, 106 and 107. Winding 106 is connected in the base/emitter circuit of transistor Q2 and winding 107 is connected in the base/emitter electrodes of transistor Q5. When central office ringing potential is impressed across primary winding 105 of transformer TR the resulting potentials appearing across windings 106 and 107 will cause transistors Q2 and Q5 to change their condition in the same manner as previously described with respect to transformer RR and transistors Q3 and Q4 respectively.

This results in ringing potential being applied to the tip of the telephone line through transistor circuit 112 instead of to the ring side, through transistor circuit 113 as described previously. Transistor Q5 turned "off" will open the transmission battery 117, from repeating coil winding 103.

In the case of customer's lines having bridged ringers, the rectifier bridge circuit 116 is omitted from the circuit and point "*a*" of repeating coil winding 104 is connected directly to ground. The central office in this case applies signalling potential to the tip side of the trunk. The impedance of capacitor C1 is too high to present any appreciable loss to the ringing potential.

What is claimed is:

1. A telephone signalling arrangement comprising an input loop having means to generate ringing signals, an output loop, and a signal repeating means connected between said input loop and said output loop for repeating said ringing signals, said signal repeating means comprising:

(a) a transformer having a primary and a secondary winding, the primary winding of said transformer being energizable in response to the ringing signals from the input loop;

(b) a voltage source connected to the output loop;

(c) a source of ringing current connected to the output loop; and (d) transistor switching means operable in response to the potential induced in the secondary winding of said transformer by its primary winding for removing said voltage source from the output loop and for connecting said source of ringing current thereto, said switching means including a normally conducting transistor connecting said voltage source to the output loop and a normally non-conducting transistor connecting the source of ringing current to the output loop, the transistors being reversible to their opposite conductivities in response to energization of the transformer upon application of a ringing signal from the input loop.

2. A telephone signalling arrangement comprising a central office loop having means to generate ringing signals, a subscriber telephone line and a signal repeating means connected between said central office and said subscriber telephone line for repeating said ringing signals to said subscriber telephone line, said signal repeating means comprising:

a transformer having a primary and a secondary winding, the primary winding of said transformer being energizable in response to the ringing signals from the central office loop;

a voltage source connected to the subscriber telephone line;

a source of ringing current connected to the subscriber telephone line; and transistor switching means operable in response to the potential induced in the secondary winding of said transformer by its primary winding for removing said voltage source from the subscriber telephone line and for connecting said source of ringing current thereto, said switching means including a normally conducting transistor connecting said voltage source to the subscriber telephone line and a normally non-conducting transistor connecting the source of ringing current to the subscriber telephone line, the transistor being reversible to their opposite conductivities in response to energization of the transformer upon application of a ringing signal from the central office loop.

3. A telephone signalling arrangement as defined in claim 2 wherein the normally non-conducting transistor is connected in series with a full wave rectifier circuit so as to maintain a proper polarity across the transistor regardless of the polarity of the ringing current.

4. A telephone signalling arrangement as defined in claim 2 including means for removing the ringing signals from the central office loop when the subscriber answers in response to the ringing signals.

5. A telephone signalling arrangement comprising a central office telephone line having a tip and a ring side and having means to generate ringing signals on each of said sides, a subscriber telephone line having a tip side and a normally grounded ring side, and signal repeating means connected between said central office telephone line and said subscriber telephone line for repeating said ringing signals, said signal repeating means comprising:

a transformer connected to each side of the central office telephone line, each transformer having a primary and a secondary winding, the primary winding of each transformer being energizable in response to the ringing signals from the respective side of the central office telephone line;

a voltage source connected to the subscriber telephone line;

a source of ringing current having one terminal connected to each side of the subscriber telephone line and the other terminal connected to ground; and transistor switching means responsive to the potential induced in the secondary winding of each transformer by its primary winding for disconnecting said voltage source from the subscriber telephone line and for connecting the source of ringing current to the tip or the ring side of the subscriber telephone line in response to ringing signals from the respective side of the central office telephone line.

6. A telephone signalling arrangement as defined in claim 5 wherein said switching means include a first normally conducting transistor connecting one terminal of said voltage source to the tip side of the subscriber telephone line, a second normally conducting transistor connecting the other side of said voltage source to the ring side of the subscriber telephone line and two normally non-conducting transistors connecting each source of ringing current respectively to the tip or to the ring side of the subscriber telephone line, the transistors being reversible to their opposite conductivities in response to energization of the respective transformers.

7. A telephone signalling arrangement as defined in claim 6 wherein each of said two normally non-conducting transistors and the second normally conducting transistor is connected in series with a full wave bridge rectifier circuit so as to maintain a proper polarity across the transistors regardless of the polarity of the potential encountered in the circuit under control.

8. A telephone signalling arrangement as defined in claim 6 including means for removing the ringing signals from the central office telephone line when a subscriber answers in response to the ringing signals.

References Cited by the Examiner

UNITED STATES PATENTS

| | | | |
|---|---|---|---|
| 2,763,726 | 9/1956 | Weller | 179—86 |
| 3,059,058 | 10/1962 | Abbott | 179—18 |
| 3,071,653 | 1/1963 | Layburn | 179—17 |
| 3,089,001 | 5/1963 | Williford | 179—84 |

ROBERT H. ROSE, *Primary Examiner.*

WALTER L. LYNDE, *Examiner.*

H. BOOHER, H. ZELLER, *Assistant Examiners.*